United States Patent
Shibata et al.

(10) Patent No.: US 7,587,123 B2
(45) Date of Patent: Sep. 8, 2009

(54) METHOD OF PROCESSING DATA, SYSTEM OF THE SAME AND VIDEO RECORDING SYSTEM

(75) Inventors: Yoshiaki Shibata, Kanagawa (JP); Mitsutoshi Shinkai, Kanagawa (JP)

(73) Assignee: Sony Corporation (JP)

(*) Notice: Subject to any disclaimer, the term of this patent is extended or adjusted under 35 U.S.C. 154(b) by 723 days.

(21) Appl. No.: 10/515,601

(22) PCT Filed: Apr. 2, 2004

(86) PCT No.: PCT/JP2004/004843

§ 371 (c)(1),
(2), (4) Date: Nov. 24, 2004

(87) PCT Pub. No.: WO2004/091203

PCT Pub. Date: Oct. 21, 2004

(65) Prior Publication Data
US 2005/0213935 A1    Sep. 29, 2005

(30) Foreign Application Priority Data
Apr. 4, 2003    (JP)    ............................... 2003-101419

(51) Int. Cl.
*H04N 5/76*    (2006.01)
(52) U.S. Cl. ...................................... 386/55
(58) Field of Classification Search ............... 386/52, 386/55, 46, 111; 345/619; 709/224
See application file for complete search history.

(56) References Cited

U.S. PATENT DOCUMENTS

| 6,870,547 | B1* | 3/2005 | Crosby et al. | ............. 345/619 |
| 7,069,314 | B1* | 6/2006 | Aoki et al. | ................. 709/224 |
| 2001/0052909 | A1 | 12/2001 | Kumagai et al. | |
| 2002/0057894 | A1* | 5/2002 | Ishige | ........................ 386/46 |
| 2002/0146232 | A1 | 10/2002 | Harradine et al. | |
| 2003/0088877 | A1* | 5/2003 | Loveman et al. | ............. 725/92 |

FOREIGN PATENT DOCUMENTS

| EP | 1 187 475 | 3/2002 |
| JP | 11-088832 | 3/1999 |
| JP | 2001-268505 | 9/2001 |
| JP | 2002-269952 | 9/2002 |
| JP | 2003-529990 | 10/2003 |
| WO | WO-01/60062 | 8/2001 |

OTHER PUBLICATIONS

International Search Report dated Jul. 27, 2004.
EPO Search Report mailed May 24, 2006.

(Continued)

*Primary Examiner*—David E Harvey
(74) *Attorney, Agent, or Firm*—Rader Fishman & Grauer PLLC; Christopher M. Tobin

(57) ABSTRACT

An edit device performs editing based on image data L_IM, generates an edit decision list L_EDL indicating that content and transmits this to a video recording system. In the edit decision list L_EDL, as an instance number of UMID, "FF FF FF" is stored. The video recording system rewrites the instance number IN_N in UMID of the edit decision list L_EDL from "FF FF FF" to "00 00 00" to generate an edit decision list H_EDL.

5 Claims, 5 Drawing Sheets

OTHER PUBLICATIONS

"Proposed SMPTE Standard for Television Unique Material Identifier (UMID)"; SMPTE Journal, vol. 109, No. 3, Mar. 1, 2000, pp. 221-225.

"Proposed SMPTE Recommended Practice Application of Unique Material Identifiers in Production and Broadcast Environments" SMPTE Journal, SMPTE Inc., vol. 109, No. 3, Mar. 1, 2000, pp. 239-240.

* cited by examiner

FIG. 4

| IN_N | MEANING DEFINED IN SMPTE |
|---|---|
| 0 | MAT_N THAT IS CONTINUOUS WITH IN_N IS NEWLY GENERATED |
| EXCEPT FOR 0 EX)FFFFFF | MAT_N THAT IS CONTINUOUS WITH IN_N ACCEDES DIRECTLY MAT_N OF UMID THAT THE OTHER MATERIAL HAS |

METHOD OF PROCESSING DATA, SYSTEM OF THE SAME AND VIDEO RECORDING SYSTEM

TECHNICAL FIELD

The present invention relates to a method of processing data generating edit data of contents data, a system of the same and a video recording system.

BACKGROUND ART

In a coverage scene, a video recording system generates first contents data (low resolution) that contents data of video and sound obtained is compressed in the predetermined data compression ratio and second contents data that said contents data is compressed in lower compression ratio than the predetermined compression ratio, and transmits the above first contents data to, for example, a remote edit device.

Next, in the edit device, editing is performed based on the first contents data and an EDL, that is an abbreviation of Edit Decision List, indicating said content of editing is generated.

Next, the edit device transmits said edit decision list to said video recording system.

The video recording system make the above edit decision list corresponding to said second contents data and records on recording media such as an optical disk.

Conventionally, as disclosed in International Publication pamphlet No. 01/60062, a management of said edit decision list is performed based on, for example, a file name specifying file path corresponding to a hierarchy system of the save-position. Said file name is necessary to be unique in the management system of said edit decision list.

However, in the above conventional method of management of the edit decision list, for example, in the case that, as mentioned above, an edit decision list generated for a first contents data is used as an edit decision list for a second contents data, the edit decision list of the first contents data and the edit decision list of the second contents data is the same file name in the above management system. Since an identification of them is performed based on their file names, there is a problem that these are not adequately identified.

Moreover, in the case that the save-position of the above edit decision list is changed, since the file path to said edit decision list is also changed, there is also a problem that a process of the name solution becomes complex.

Moreover, in the above conventional method of management of edit decision list, there is a problem that the edit decision list of the first contents data and the edit decision list of the second contents data cannot be identified, in addition a problem that a relationship between them can be shown.

DISCLOSURE OF THE INVENTION

The present invention was made in consideration of said problems, therefore the object of the present invention is to produce a method of processing data that in the case that based on a first edit data generated by editing performed based on the first contents data of a first resolution, a second edit data of a second contents data of a second resolution higher than said first resolution is generated, said first edit data and said second edit data can be identified by a simple process and these relationship can be clarified, a system of the same and a video recording system.

To achieve said object, a method of processing data of a first invention is a method of processing data generating edit data indicating content of editing concerning first contents data of first resolution for predetermined image contents and second contents data of second resolution higher than said first resolution for said predetermined image contents, said method of processing data comprises a first step of generating a first edit data comprising predetermined data indicating content of editing performed based on said first contents data, identifier data allocated to said first contents data and said second contents data and property data indicating that said identifier data is reference to contents data of first resolution, and a second step of rewriting said property data of said first edit data generated in said first step to property data indicating that it is reference to said contents data of second resolution to generate second editing data concerning to said second contents data.

A mode of operation of processing data of a first invention is as following.

First, in the first step, a first edit data comprising predetermined data indicating content of editing performed based on said first contents data, identifier data allocated to said first contents data and said second contents data and property data indicating that said identifier data is reference to contents data of first resolution is generated.

Next, in the second step, said property data of said first edit data generated in said first step is rewritten to property data indicating that it is reference to said contents data of second resolution and second editing data concerning to said second contents data is generated.

A method of processing data of a second invention is a method of processing data generating edit data indicating content of editing concerning to first contents data of first resolution for a predetermined image contents and second contents data of second resolution higher than said first resolution for said predetermined image contents, said method of processing data comprises a first step of receiving first edit data comprising predetermined data indicating content of editing performed based on said first contents data, identifier data allocated to said first contents data and said second contents data and property data indicating that said identifier data is reference to contents data of first resolution, and a second step of rewriting said property data of said first edit data received in said first step to property data indicating that it is reference to said contents data of second resolution to generate second editing data concerning to said second contents data.

A mode of operation of processing data of a second invention is as following.

First, in the first step, first edit data comprising predetermined data indicating content of editing performed based on said first contents data, identifier data allocated to said first contents data and said second contents data and property data indicating that said identifier data is reference to contents data of first resolution is received.

Next, in the second step, said property data of said first edit data received in said first step is rewritten to property data indicating that it is reference to said contents data of second resolution and second editing data concerning to said second contents data is generated.

A system of processing of a third invention is a system of processing data generating edit data indicating content of editing concerning to first contents data of first resolution for a predetermined image contents and second contents data of second resolution higher than said first resolution for said predetermined image contents, said system of processing data comprises a receiving method for receiving first edit data comprising predetermined data indicating content of editing performed based on said first contents data, identifier data allocated to said first contents data and said second contents data and property data indicating that said identifier data is reference to contents data of first resolution, and a controlling means for rewriting said property data of said first edit data received in said receiving means to property data indicating that it is reference to said contents data of second resolution and to generate second editing data concerning to said second contents data.

A mode of operation of processing data of a third invention is as following.

First, a receiving means receives first edit data comprising predetermined data indicating content of editing performed based on said first contents data, identifier data allocated to said first contents data and said second contents data and property data indicating that said identifier data is reference to contents data of first resolution.

Next, a controlling means rewrites said property data of said first edit data received in said receiving means to property data indicating that it is reference to said contents data of second resolution and generates second editing data concerning to said second contents data.

A video recording system of a fourth invention is a video recording system generating second edit data concerning to second contents data of second resolution higher than first resolution for predetermined image contents by using first edit data obtained based on first contents data of said first resolution for said predetermined image contents, said video recording system comprises a generating means and generates said first contents data and said second contents data and to allocate identifier data to said first contents data and said second contents data, a transmitting means for transmitting said first contents data generated by said generating means, a receiving means for receiving first edit data comprising predetermined data indicating content of editing performed based on said first contents data, said identifier data and property data indicating that said identifier data is reference to contents data of first resolution at a destination of said first contents data by said transmitting means, and a controlling means for rewriting said property data of said first edit data that said receiving means received to property data indicating that it is reference to said contents data of second resolution, to generate second editing data concerning to said second contents data, to connect said second edit data with said second contents data generated by said generating means and to record on recording media or to transmit.

A mode of operation of processing data of a fourth invention is as following.

First, a generating means generates said first contents data and said second contents data and allocates identifier data to said first contents data and said second contents data.

Next, a transmitting means transmits said first contents data generated by said generating means.

Next, a receiving means receives first edit data comprising predetermined data indicating content of editing performed based on said first contents data, said identifier data and property data indicating that said identifier data is reference to contents data of first resolution at a destination of said first contents data by said transmitting means.

Next, a controlling means rewrites said property data of said first edit data that said receiving means received to property data indicating that it is reference to said contents data of second resolution, generates second editing data concerning to said second contents data, connects said second edit data with said second contents data generated by said generating means and records on recording media or transmits.

BRIEF DESCRIPTION OF THE DRAWINGS

FIG. 4 is a view for explaining a meaning that an instance number IN_N shown in FIG. 3 shows.

BEST MODE FOR CARRYING OUT THE INVENTION

Figure 1:
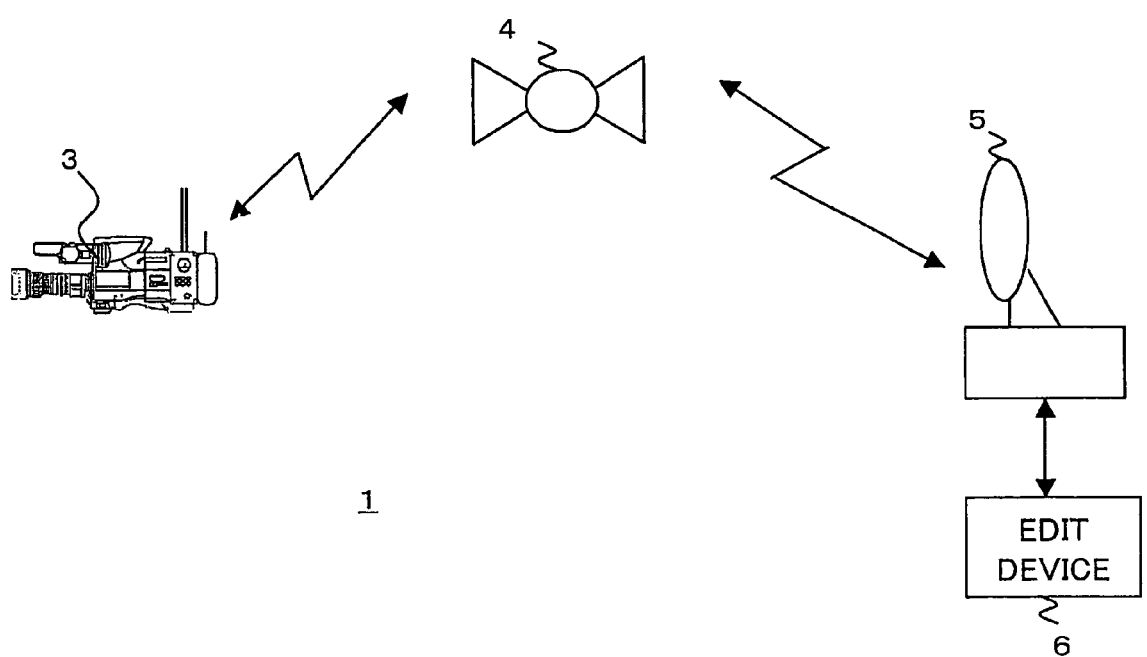
FIG. 1 is a block diagram concerning embodiments of the present invention.

Hereinafter examples of embodiment of the present invention will be explained by referring to the drawings.

FIG. 1 is a block diagram of an edit system 1 concerning embodiment of the present invention.

As shown in FIG. 1, the edit system 1, for example, has a video recording system 3 and an edit device 6, these perform communication through a communication satellite 4 and an antenna 5.

Here, the video recording system 3 corresponds to the video recording system in the fourth invention.

The video recording system 3 is, for example, in a coverage scene and so on, and generates image data of high resolution H_IM (a second contents data of second resolution of the present invention) and image data L_IM (a first contents data of first resolution of the present invention) for image data obtained from objects of coverage (a predetermined image contents of the present invention).

Next, the video recording system 3 transmits the image data of low resolution L_IM to the edit device 6 by using FTP, that is an abbreviation of File Transfer Protocol, and so on.

The edit device 6 performs editing based on the image data L_IM, generates an edit decision list L_EDL (a first edit data of the present invention) indicating said content and transmits this to the video recording system 3 by FTP.

The edit decision list L_EDL includes data UMID, that is an abbreviation of Unique Material Identifier, for indicating reference to the image data L_IM, however, as an instance number IN_N (a property data of the present invention) of it, for example, "FF FF FF" (a second value of the present invention) is stored.

The data UMID is standardized by SMPTE, that is an abbreviation of Society of Motion Picture and Television Engineers, "FF FF FF" means that a material number MAT_N (identifier data of the present invention) that is continuous with said instance number IN_N accedes directly a material number MAT_N of data UMID of which the other material has.

The video recording system 3 rewrites the instance number IN_N in the data UMID of said edit decision list L_EDL that is received from the edit device 6 from "FF FF FF" to "00 00 00" (a first value of the present invention) and generates an edit decision list H_EDL (a second edit data of the present invention).

"00 00 00" means that a material number MAT_N that is continuous with said instance number IN_N is a thing newly generated, that is to say it is reference to the image data H_IM.

Next, the video recording system 3 records said generated edit decision list H_EDL corresponding to image data of high resolution H_IM on recording media such as an optical disk.

Hereinafter, the structure of the video recording system 3 and the edit device 6 shown in FIG. 1 will be explained in detail.

[Video Recording System 3]

Figure 2:
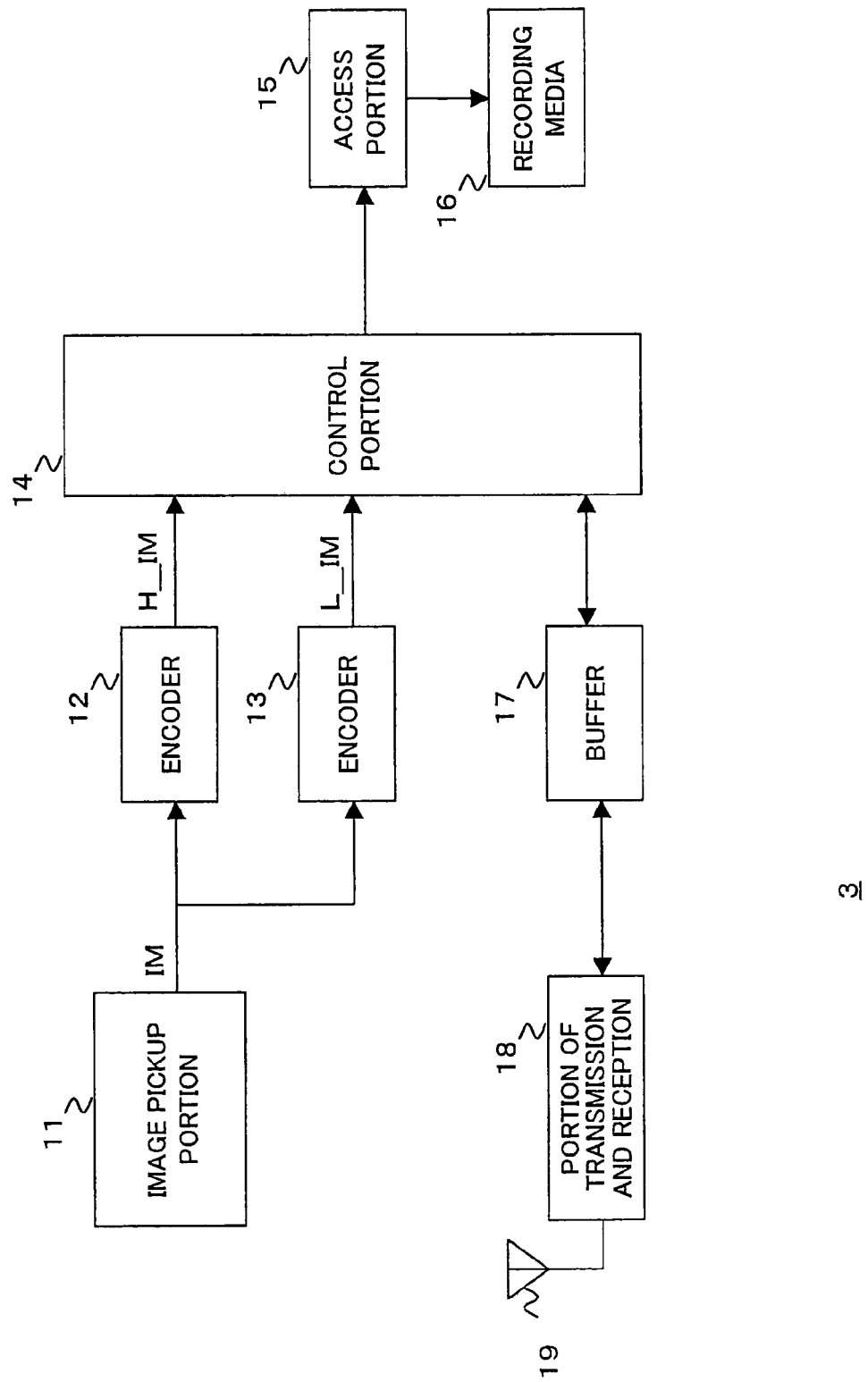
FIG. 2 is a functional block diagram of a video recording system shown in FIG. 1.

FIG. 2 is a functional block diagram of the video recording system 3 shown in FIG. 1.

As shown in FIG. 2, the video recording system 3 has, for example, an image pickup portion 11, an encoder 12, an encoder 13, a control portion 14, an access portion 15, a buffer 17, a portion of transmission and reception 18 and an antenna 19.

Here, the image pickup portion 11 and the encoder 12, 13 correspond to a generating means in the fourth invention.

Moreover, a portion of transmission and reception corresponds to a receiving means in the third invention, and a transmitting means and a receiving means in the fourth invention.

Moreover, the control portion 14 corresponds to a controlling means in the third and fourth invention.

The image pickup portion 11, for example, generates image data IM by taking an image of an object of coverage and outputs to the encoder 12 and the encoder 13.

The encoder 12 compresses the image data IM inputted from the image pickup portion 11, and, for example, generates image data of resolution as high as the grade which can be broadcasted H_IM.

The encoder 13 compresses the image data IM inputted from the image pickup portion 11, and, for example, generates image data of resolution as low as the grade which cannot be broadcasted but can be used enough to edit L_IM.

These image data H_IM and L_IM are different in resolution, but are generated to be same content in units of frame. Frames in each image data corresponding to certain time code or certain frame number are same frames. Therefore, a desired result is obtained by editing the image data of high resolution H_IM by an edit decision list made based on the image data L_IM.

The control portion 14 transmits the image data of low resolution L_IM that the encoder 13 generated to the edit device 6 from the antenna 19 through the buffer 17.

The control portion 14 write said image data H_IM and L_IM on the recording media 16 through the access portion 15.

When the edit device 6 inputs the edit decision list L_EDL generated based on the image data L_IM through the antenna 19, a portion of transmission and reception 18 and the buffer 17, the control portion 14 rewrites the instance number IN_N of the data UMID in the edit decision list L_EDL from "FF FF FF" to "00 00 00" and generates an edit decision list H_EDL.

The control portion 14 records said generated edit decision list H_EDL corresponding to the image data of high resolution H_IM on recording media such as an optical disk.

The access portion 15 writes the data inputted from the control portion 14 on the recording media 16.

The recording media is, for example, a portable recording media that is removable from the video recording system 3, such as, for example, an optical disk.

The buffer 17 stores the data inputted from the control portion 14 temporarily.

The portion of transmission and reception 18 performs transmission and reception of data between that and the edit device 6 through the antenna 19, the communication satellite 14 shown in FIG. 1 and the antenna 5.

[Edit Device 6]

The edit device 6 performs editing based on the image data of low resolution L_IM received by the antenna 5 from the video recording system 3 and generates an edit decision list L_EDL indicating the content.

Said editing performs processes of bringing the image data within a predetermined airtime, inserting various effects, embedding text data with script and so on, inserting an image for switching of scene, and so on.

At this time, the edit device 6 stores "FF FF FF" as the instance number IN_N in the data UMID of the edit decision list L_EDL.

The edit device 6 transmits said generated edit decision list L_EDL to the video recording system 3 by FTP and so on.

[Edit Decision List L_EDL, H_EDL]

Figure 3:
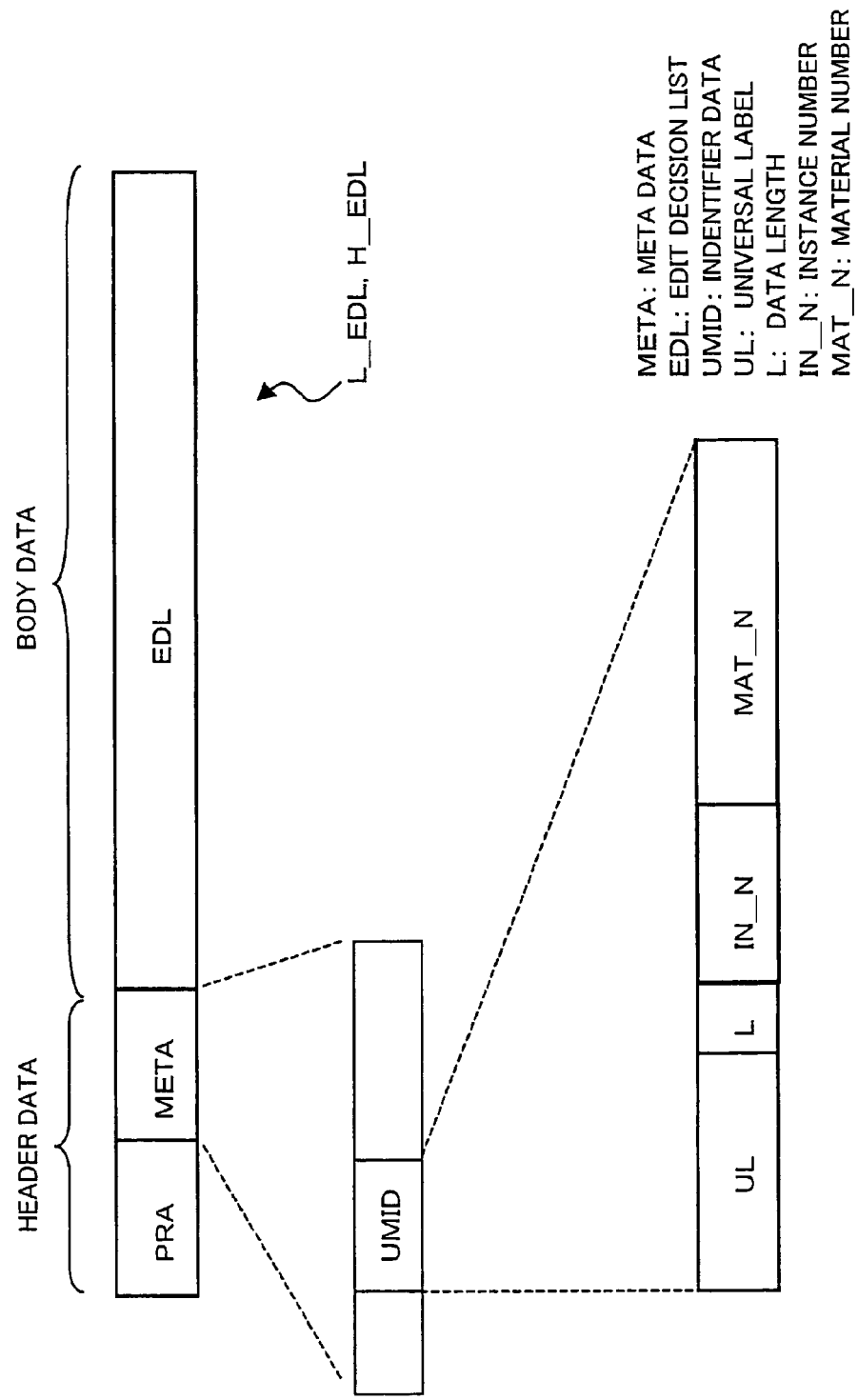
FIG. 3 is a view for explaining a format of an edit decision list of embodiment of the present invention.

FIG. 3 is an example of a format of the edit decision lists L_EDL and H_EDL.

As shown in FIG. 3, the edit decision lists L_EDL and H_EDL is constructed by header data consisting of preamble PRA and meta data META, and body data storing data indicating the content of editing (predetermined data of the present invention).

The meta data META has, for example, the data UMID of 32 bytes.

The data UMID has a universal label UL, data length L, the instance number IN_N and the material number MAT_N based on SMPTE standard.

The universal label UL is a unique identifier indicating that the byte sequence is UMID.

The data length L, is 1 byte continuous with the universal label UL, and shows the data length continuous with it in units of bytes.

The instance number IN_N is, for example, 3 bytes.

The instance number IN_N, in the case of "00 00 00" as shown in FIG. 4, according to SMPTE, means that a material number MAT_N that is continuous with said instance number IN_N is a newly generated thing.

Moreover, the instance number IN_N, not in the case of "00 00 00" as shown in FIG. 4, according to SMPTE, means that a material number MAT_N that is continuous with said instance number IN_N accedes directly the material number MAT_N of the data UMID of which the other material has.

The material number MAT_N, for example, is 16 bytes, and takes a global unique value. In the present embodiment, the material is the image data L_IM and H_IM, and the data UMID is used as their unique identifiers.

Being promised on that a material generated at a certain time is at most only one, for example, since an arbitrary network device, that is, for example, the video recording system 3 or the edit device 6 shown in FIG. 1, is identified in global unique by MAC, that is an abbreviation of Media Access Control, address, the material number MAT_N is generated by combining the MAC address and the time when the material generated.

In the present embodiment, generation and allocation of said material number MAT_N is, for example, performed by the control means 14 or a generating means not shown in drawings when the image data H_IM is generated. Moreover, the control means 14 or said generating means allocates the material number MAT_N that is performed generation and allocation to the image data H_IM also to the image data L_IM.

In the present embodiment, in edit decision lists L_EDL and H_EDL, the universal label UL, data length L and the material layer MAT_N are all same, the only instance number IN_N is different.

Concretely, the instance number of the edit decision list L_EDL is "FF FF FF", and the instance number of the edit decision list H_EDL is "00 00 00".

Hereinafter, an operation example of the edit system 1 in the present embodiment will be explained.

Figure 5:
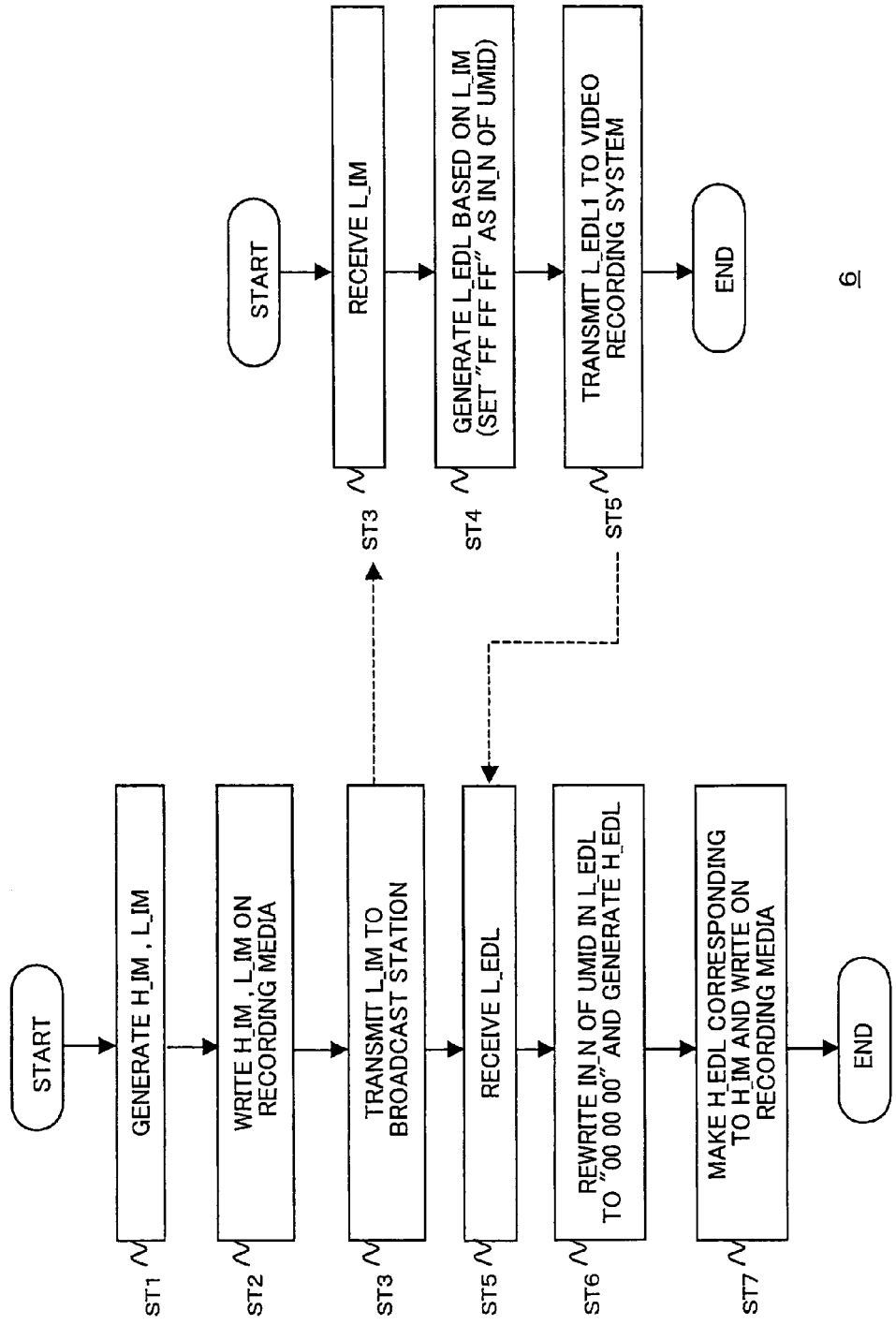
FIG. 5 is a view for explaining an operation example of an edit system shown in FIG. 1.

FIG. 5 is a flow chart for explaining said operation example.

Hereinafter, each step shown in FIG. 5 will be explained.

Step ST1

The image pickup portion 11 of the video recording system 3 shown in FIG. 2 generates the image data IM obtained from objects of coverage.

Next, the encoder 12 compresses the image data IM to generate the image data of high resolution H_IM.

Moreover, the encoder 13 compresses the image data IM to generate the image data of low resolution L_IM.

Step ST2

The control portion 14 outputs the image data H_IM and L_IM generated in the step ST1 to the access portion 15.

The access portion 15 writes the image data H_IM and L_IM on the recording media 16.

Step ST3

The control portion 14 transmits the image data of low resolution L_IM generated in the step ST1 to the edit device 6 through the buffer, the portion of transmission and reception 18 and the antenna 19.

The edit device 6 receives the image data L_IM from the video recording system 3.

Step ST4

The edit device 6 performs editing based on the image data L_IM received in the step ST3 and generates the edit decision list L_EDL indicating the content of said editing.

At this time, the edit device 6 stores "FF FF FF" as the instance number IN_N of the data UMID in the edit decision list L_EDL.

Step ST5

The edit device 6 transmits the edit decision list L_EDL generated in the step ST4 to the video recording system 3 through the antenna 5 and the communication satellite 4.

The video recording system 3 receives the edit decision list L_EDL from the edit device 6 by the antenna 19 shown in FIG. 2, and outputs to the control portion 14 through the portion of transmission and reception 18 and the buffer 17.

Step ST6

The control portion 14 of the video recording system 3 rewrite the instance number IN_N of the data UMID in the edit decision list L_EDL inputted in the step ST5 from "FF FF FF" to "00 00 00" to generate the edit decision list H_EDL.

Step ST7

The control portion of the video recording system 3 makes the edit decision list H_EDL generated in the step ST6 corresponding to the image data of high resolution H_IM to record on the recording media, such as an optical disk.

Note that the control portion 14 may make the edit decision list H_EDL generated in the step ST6 corresponding to the image data of high resolution H_IM to transmit to the predetermined destination.

In the above-mentioned embodiment, the process about the image data IM about the video recording system 3 is explained with an example, however, the video recording system 3 generates the audio data based on the sound from the coverage position and writes this on the recording media 16.

Moreover, about said audio data, the similar process to said image data IM may be performed.

As explained above, in the edit system 1, as the instance number IN_N of the data UMID in the edit decision list L_EDL generated in the edit device 6, "FF FF FF" that means that the material number MAT_N that is continuous with said instance number IN_N accedes the material number MAT_N that the other material has is set.

Moreover, in the video recording system 3, the instance number IN_N of the data UMID in the edit decision list L_EDL is rewritten from "FF FF FF" to "00 00 00" that means that the material number MAT_N that is continuous with said instance number IN_N is newly generated, and the edit decision list H_EDL is generated.

Hence, by using the edit system 1, it can be identified that each edit decision list is of which the image data of low resolution L_IM or the image data of high resolution H_IM. That is to say, if the instance number IN_N is "FF FF FF", it is the edit decision list L_EDL, if the instance number IN_N is "00 00 00", it is the edit decision list H_EDL.

Moreover, by using the edit system 1, it can be easily comprehended that based on the instance number IN_N of the edit decision list L_EDL, in the image data L_IM corresponding to said edit decision list L_EDL, the image data of high resolution H_IM corresponding to that exists, the edit decision list H_EDL is a list that the instance number IN_N of the edit decision list L_EDL is defined as "00 00 00".

Moreover, by making the instance number IN_N of the edit decision list H_EDL as "00 00 00", the edit decision list H_EDL corresponding to the image data of high resolution H_IM can be defined as master, the edit decision list L_EDL corresponding to the image data of low resolution L_IM can be defined as slave.

Moreover, by using the edit data system 1, because of not performing the name solution that the file path is specified, the edit decision list H_EDL and L_EDL can be identified in the process easier than conventional process. In particular, it is effective in the case that the save-positions of the edit decision list H_EDL and L_EDL are changed.

The present invention is not limited to the above-mentioned embodiments.

For example, in the above-mentioned embodiments, the case that "FF FF FF" is set as the instance number IN_N of the edit decision list L_EDL is explained with an example, however, said instance number IN_N is optional except for "00 00 00" according to SMPTE.

Moreover, in the above-mentioned embodiments, as the file data of the present invention, the file data of MXF explained by using FIG. 3 FILE_1~FILE_N are explained with an example, however, the file data of the present invention is not limited if the file data includes the contents data and the attribute data indicating the attribute of said contents data.

Moreover, in the above-mentioned embodiments, as the identifier data and the property data, the material number MAT_N of UMID defined in SMPTE and the instance number IN_N are explained with an example, however, if the identifier data of the present invention is the data to identify a predetermined data indicating the contents of performing editing based on the contents data, it is not especially limited, if the property data is the data to show said identifier data concerns of which the contents data of the first resolution or the second resolution, it is not especially limited.

As explained above, according to the present invention, based on the first edit data generated by editing performed based on the first contents data of the first resolution, in the case of generating the second edit data of the second contents data of the second resolution higher than said first resolution, the method of processing data that said first edit data and the second edit data can be identified by the simple process and these relationship can be clarified, the system of the same and the video recording system can be provided.

INDUSTRIAL APPLICABILITY

The present invention is possible to apply to a system of processing data that generates edit data of contents data.

The invention claimed is:

1. For use in a video system including an encoder and a control portion, a method of processing data generating edit data indicating content of editing concerning first contents data of first resolution for predetermined image contents and second contents data of second resolution higher than said first resolution for said predetermined image contents, said method of processing data comprising:
   a first step of generating, using said encoder, a first edit data comprising predetermined data indicating content of editing performed based on said first contents data, identifier data allocated to said first contents data and said second contents data and property data indicating that said identifier data is reference to contents data of first resolution; and
   a second step of rewriting, using said control portion, said property data of said first edit data generated in said first step to property data indicating that it is reference to said contents data of second resolution to generate second editing data concerning to said second contents data,
   wherein when defining that said property data shows a first value indicating that said identifier data corresponding to said property data is newly generated or a second value indicating that said identifier data corresponding to said property data accedes said identifier data of the other data, and when said contents data of first resolution accedes said identifier data generated newly for said second contents data, said first step generates said edit data comprising said property data indicating said second value, and said second step rewrites said second value that said property data in said first edit data shows to said first value to generate said second edit data.

2. A method of processing data as set forth in claim 1, wherein said second edit data generated in said second step corresponds to said second contents data, is recorded on recording media or is transmitted.

3. For use in a video system including a receiving portion and a control portion, a method of processing data generating edit data indicating content of editing concerning to first contents data of first resolution for a predetermined image contents and second contents data of second resolution higher than said first resolution for said predetermined image contents, said method of processing data comprising:
   a first step of receiving, using said receiving portion, first edit data comprising predetermined data indicating content of editing performed based on said first contents data, identifier data allocated to said first contents data and said second contents data and property data indicating that said identifier data is reference to contents data of first resolution; and
   a second step of rewriting, using said control portion, said property data of said first edit data received in said first step to property data indicating that it is reference to said contents data of second resolution to generate second editing data concerning to said second contents data,
   wherein when defining that said property data shows a first value indicating that said identifier data corresponding to said property data is newly generated or a second value indicating that said identifier data corresponding to said property data accedes said identifier data of the other data, and when said contents data of first resolution accedes said identifier data generated newly for said second contents data, said first step receives said edit data comprising said property data indicating said second value, and said second step rewrites said second value that said property data in said first edit data shows to said first value to generate said second edit data.

4. A system of processing data generating edit data indicating content of editing concerning to first contents data of first resolution for a predetermined image contents and second contents data of second resolution higher than said first resolution for said predetermined image contents, said system of processing data comprising:
   a receiving means for receiving first edit data comprising predetermined data indicating content of editing performed based on said first contents data, identifier data allocated to said first contents data and said second contents data and property data indicating that said identifier data is reference to contents data of first resolution; and
   a controlling means for rewriting said property data of said first edit data received in said receiving means to property data indicating that it is reference to said contents data of second resolution and to generate second editing data concerning to said second contents data,
   wherein when defining that said property data shows a first value indicating that said identifier data corresponding to said property data is newly generated or a second value indicating that said identifier data corresponding to said property data accedes said identifier data of the other data, and when said contents data of first resolution accedes said identifier data generated newly for said second contents data, said receiving means receives said edit data comprising said property data indicating said second value, and said controlling means rewrites said second value that said property data in said first edit data shows to said first value to generate said second edit data.

5. A video recording system generating second edit data concerning to second contents data of second resolution higher than first resolution for predetermined image contents by using first edit data obtained based on first contents data of said first resolution for said predetermined image contents, said video recording system comprising:
   a generating means for generating said first contents data and said second contents data and to allocate identifier data to said first contents data and said second contents data;
   a transmitting means for transmitting said first contents data generated by said generating means;
   a receiving means for receiving first edit data comprising predetermined data indicating content of editing performed based on said first contents data, said identifier data and property data indicating that said identifier data is reference to contents data of first resolution at a destination of said first contents data by said transmitting means, and;
   a controlling means for rewriting said property data of said first edit data received in said receiving means to property data indicating that it is reference to said contents data of second resolution, to generate second editing data concerning to said second contents data, to connect said second edit data with said second contents data generated by said generating means and to record on recording media or to transmit.

* * * * *